UNITED STATES PATENT OFFICE.

ALBERT H. STONE, OF BOSTON, MASSACHUSETTS.

DEPILATORY AND PROCESS OF MAKING IT.

1,041,897.     Specification of Letters Patent.     Patented Oct. 22, 1912.

No Drawing.     Application filed December 18, 1911. Serial No. 666,368.

*To all whom it may concern:*

Be it known that I, ALBERT H. STONE, a citizen of the United States, residing at Boston, in the county of Suffolk and State of Massachusetts, have invented a certain new and useful Depilatory and Process of Making It, of which the following is a specification.

The principal object of the present invention is to provide a depilatory which shall be comparatively cheap in preparation and use and possessed of increased, approximately double, pulling properties (that is by the use of it wool comes off easier), which may be used at a much less degree of concentration, which removes the bulb or root of the wool thereby increasing the weight of wool obtained, and which leaves the wool in improved condition and not affected in fiber or texture and the finished leather improved in quality and stronger and mellower, that is more flexible, than heretofore.

The invention comprises a depilatory consisting of an admixture of or the result of slaking quick lime with a solution of sulfid of sodium and adding sulfhydrate of calcium, and it further consists in the process of making the depilatory which comprises slaking quick lime with a solution of sulfid of sodium and adding a solution of sulfhydrate of calcium.

The result produced by slaking quick lime with a solution of sodium sulfid has been successfully used as a depilatory, but by adding or combining sulfhydrate of calcium to or with it, a much better depilatory having many advantages and a different mode of operation is produced. Sulfhydrate of calcium is usually a clear yellow liquid of about 24° Baumé. To the known pasty depilatory, being the result produced by slaking quick lime with a solution of sodium sulfid, is added 10% more or less of sulfhydrate of calcium. This can be done after the lime is slaked and it is done by stirring. The result is the depilatory which constitutes the subject-matter of this invention.

This depilatory can be used at about 12° Baumé, being thinned for that purpose by the addition of water. This depilatory operates by removing the bulb or root of the wool, whereas the depilatory of the prior art above referred to cuts the wool off at the surface. Furthermore the depilatory of this invention enables the wool to be more easily pulled and the wool is heavier since its roots or bulbs come off with it. The latter depilatory, since it is used at a less degree of concentration, may be diluted with relatively more water and is therefore cheaper in use and the qualities of the resulting wool and leather are much better than heretofore. It has been suggested that the depilatory of the prior art contains a small percentage of sulfhydrate of calcium which resulted from chemical reaction, and by the present invention the contents of sulfhydrate of calcium is increased and may be properly controlled in a comparatively inexpensive and efficient manner by independently preparing or obtaining sulfhydrate of calcium and adding or otherwise incorporating it into the depilatory. The depilatory of the present invention containing admixed sulfhydrate of calcium, as has been said, appears to have a different mode of operation in loosening the wool and to possess marked advantages and utilities and to accomplish results not possible with the depilatory of the prior art to which reference has been made. Sulfhydrate of calcium is possessed of great depilatory powers, but it must be used in admixture or combination in order to produce commercially successful results and it is an important feature of my invention that the result produced by slaking quick lime with a solution of sulfid of sodium, is such an admixture as will not only permit of the commercially successful use of sulfhydrate of calcium, but will also produce an improved depilatory having the improved mode of operation herein described.

What I claim is:

1. The process of making a depilatory which consists in slaking quick lime with a solution of sulfid of sodium and adding previously prepared sulfhydrate of calcium to the extent of at least ten per cent. of the depilatory, substantially as described.

2. A depilatory consisting of an admixture of slaked lime, sulfid of sodium, and previously prepared sulfhydrate of calcium to the extent of at least ten per cent. of the depilatory, substantially as described.

In testimony whereof I have hereunto signed my name.

ALBERT H. STONE. [L. S.]

Witnesses:
JAMES F. MANION,
HERMAN A. BEHLING.

Copies of this patent may be obtained for five cents each, by addressing the "Commissioner of Patents, Washington, D. C."